United States Patent [19]

Münzmay et al.

[11] Patent Number: 5,508,312
[45] Date of Patent: Apr. 16, 1996

[54] PROCESS FOR THE PRODUCTION OF COMPOUNDS CONTAINING HYDROXYL GROUPS FROM (POLYURETHANE) POLYUREA WASTE MATERIALS

[75] Inventors: Thomas Münzmay, Dormagen; Hartmut Nefzger, Pulheim; Werner Rasshofer, Köln; Walter Meckel, Neuss, all of Germany

[73] Assignee: Bayer Aktiengesellschaft, Leverkusen, Germany

[21] Appl. No.: 429,411

[22] Filed: Apr. 26, 1995

[30] Foreign Application Priority Data

May 9, 1994 [DE] Germany .................... 44 16 322.3

[51] Int. Cl.⁶ .................................................. C08J 11/04
[52] U.S. Cl. .................................................. 521/49.5
[58] Field of Search ...................................... 521/49.5

[56] References Cited

U.S. PATENT DOCUMENTS

| | | | |
|---|---|---|---|
| 3,983,087 | 9/1976 | Tucker et al. | 521/49.5 |
| 4,039,568 | 8/1977 | Sakai et al. | 521/49.5 |
| 4,316,992 | 2/1982 | Gerlock et al. | 521/49.5 |
| 4,317,939 | 3/1982 | Gerlock et al. | 521/49.5 |
| 4,439,546 | 3/1984 | Brennan et al. | 521/49.5 |
| 4,451,583 | 5/1984 | Chesler | 521/49.5 |
| 4,511,680 | 4/1985 | Niederellmann et al. | 521/49.5 |
| 5,338,763 | 8/1994 | Munzamy et al. | 521/49.5 |
| 5,410,008 | 4/1995 | Bauer | 528/61 |

OTHER PUBLICATIONS

Database WPI, Wk 7931, AN 79–57188B & JP–A–54 078 798 (Asahi Electrochem Ind KK) Jun. 1979.

*Primary Examiner*—Morton Foelak

[57] ABSTRACT

Compounds containing hydroxyl groups, which are suitable for the polyisocyanate addition polymerization process, are prepared from polyurethane-polyurea and/or polyurea waste materials. These compounds are produced by reacting a finely divided polyurethane-polyurea and/or polyurea waste material with a low molecular weight diol and/or polyol (and optionally a higher molecular weight polyol) and a low molecular weight urea and/or carbamic acid ester. This reaction may be carried in either one stage or two stages. In the two stage process, the waste material and diol/polyol are reacted in a first stage at a temperature of from about 100 to about 260° C. In the second stage, the amine-containing alcoholysis product obtained in the first stage is reacted with a low molecular weight urea and/or carbamic acid ester. In the single stage process, the polyurethane-polyurea and/or polyurea waste material is reacted with a low molecular weight diol and/or polyol in the presence of a low molecular weight urea and/or carbamic acid ester.

7 Claims, No Drawings

PROCESS FOR THE PRODUCTION OF COMPOUNDS CONTAINING HYDROXYL GROUPS FROM (POLYURETHANE) POLYUREA WASTE MATERIALS

BACKGROUND OF THE INVENTION

This invention relates to a process for the production of compounds containing hydroxyl groups from polyurethane-polyurea and/or polyurea waste materials which are suitable for use in the polyisocyanate addition polymerization process. In this process, the waste material is decomposed with alcohol and the alcoholysis product is further reacted to reduce the content of low molecular weight, sterically unhindered aromatic amines.

The decomposition of plastics obtained by the polyisocyanate addition polymerization process with alcohols is known in principle. However, when polyurethaneopolyurea and/or polyurea waste materials are decomposed by alcoholysis, it is difficult to recover usable products. Working up plastics which have been produced using poly-isocyanate mixtures of the diphenylmethane series and aromatic diamines as chain extenders (i.e., PUR waste materials with a high content of urea groups) is particularly difficult.

Alcoholysis products of polyurethane-polyurea and/or polyurea waste materials with a high content of urea groups are characterized by a relatively high content of low molecular weight, primary aromatic amines, particularly sterically unhindered primary aromatic amines (B. Naber: "Recycling of Polyurethanes (PUR)", Kunststoff-recycling-Tagung der TU Berlin [Plastics Recycling Report of the Technical University of Berlin], 01.10.91).

These characteristics of the alcoholysis product may limit considerably its usefulness in isocyanate addition polymerization processes. For example, a high content of low molecular weight primary aromatic amines has a negative effect on the processability of alcoholysis products of this type (e.g., in reaction injection molding processes (RIM)), due to the high reactivity of such amines. This high reactivity causes short flow distances and results in inability to fill complicated molds. A high content of low molecular weight primary aromatic amines (particularly sterically unhindered primary aromatic amines) can cause inferior properties such as high glass transition temperature, low ultimate tensile strength and low elongation at tear in polymers produced with that alcoholysis product.

SUMMARY OF THE INVENTION

It is an object of the present invention to provide a process for producing compounds containing hydroxyl groups from polyurethane-polyurea and/or polyurea waste materials.

It is another object of the present invention to provide a process for producing compounds containing hydroxyl groups from (polyurethane)polyurea and/or polyurea waste materials which compounds are useful in isocyanate poly-addition processes.

It is a further object of the present invention to provide a process for producing compounds containing hydroxyl groups from (polyurethane)polyurea and/or polyurea waste materials which compounds have a significantly lower content of low molecular weight, sterically unhindered primary aromatic amines than prior art alcoholysis products.

These and other objects which will be apparent to those skilled in the art are accomplished by reacting a coarsely ground or finely comminuted (polyurethane) polyurea and/or polyurea waste material with (1) a low molecular weight diol and/or polyol and/or higher molecular weight diol and/or polyol and (2) a low molecular weight urea and/or carbamic acid ester. This process may be carried out by first reacting the waste material with the above mentioned diol and/or polyol and subsequently reacting the alcoholysis product with the urea and/or carbamic acid ester. The process of the present invention may also be carried out by reacting the waste material with the above mentioned diols and/or polyols in the presence of a low molecular weight urea and/or carbamic acid ester.

DETAILED DESCRIPTION OF THE PRESENT INVENTION

The present invention relates to a process for the production of compounds containing hydroxyl groups, which are suitable for the polyisocyanate addition polymerization process, from polyurethane-polyurea and/or polyurea waste materials.

This process may be carried out in two stages. In the first stage, coarsely ground or finely comminuted polyurethane-polyurea and/or polyurea waste material is reacted with one or more low molecular weight diols and/or polyols and/or with higher molecular weight diols and/or polyols, at a temperature of from about 100° to about 260° C. In the second stage, the amine-containing alcoholysis product obtained in the first stage is reacted with one or more low molecular weight urea and/or carbamic acid esters.

The process of the present invention may also be carried out by reacting a polyurethane-polyurea and/or polyurea waste material with one or more low molecular weight diols and/or polyols and/or higher molecular weight diols and/or polyols in the presence of one or more low molecular weight urea and/or carbamic acid esters at a temperature of from about 100° to about 260° C.

The alcoholysis reaction which takes place in the process of the present invention may be carried out by any of the methods known to those skilled in the art.

In one suitable method, coarsely ground or finely comminuted (diameter of from about 0.1 to 50 mm) polyurethane-polyurea and/or polyurea waste material is reacted with at least one higher molecular weight diol and/or polyol at a temperature of from about 120° to about 260° C., preferably from about 160° to about 240° C. The reactants may be used in quantities such that the weight ratio of diol or polyol to waste material is from about 1:2 to about 100:1, preferably from about 1:1 to about 20:1. Any of the diols or polyols known from polyurethane chemistry may be used in this method. Preferred diols and polyols include polyethers, polyesters, polylactones and polycarbonates having a molecular weight of from about 350 to about 4000, preferably from about 500 to about 2000 and functionalities >2.

In another alcoholysis method which may be used in the practice of the present invention, coarsely ground or finely comminuted polyurethane-polyurea and/or polyurea waste material is reacted with at least one low molecular weight diol and/or polyol at a temperature of from about 100° to about 260° C., preferably from about 140° to about 240° C. The reactants may be used in quantities such that the weight ratio of waste material to low molecular weight diol and/or polyol is from about 10:1 to about 1:10, preferably from about 5:1 to about 1:3.

Examples of suitable low molecular weight diols and/or polyols include ethylene glycol, diethylene glycol and higher condensates, 1,2-propylene glycol, dipropylene glycol and higher condensates, hexanediol, glycerol, trimethylolpropane and their ethoxylation and/or propoxylation products having molecular weights <350.

Upon completion of the alcoholytic decomposition reaction, the diols and/or polyols, which are used in excess, may optionally be partially removed by distillation from the decomposition products containing hydroxyl groups.

Using alcoholysis methods such as those described above, compounds containing hydroxyl groups are obtained which still contain significant amounts of free, sterically unhindered, aromatic amines. Use of these compounds in polyisocyanate addition polymerization processes is therefore considerably restricted or impossible.

Surprisingly, it has now been found that the content of interfering amines can be reduced by reacting the alcoholysis product with a low molecular weight urea and/or carbamic acid ester or by including a low molecular weight urea and/or carbamic acid ester in the reaction mixture during alcoholysis. The amine content is reduced to such an extent that the products obtained are suitable for re-utilization as reactants for polyisocyanates in the polyisocyanate addition polymerization process.

The reaction of ureas with aromatic amines in the presence of alcohols is known in the art. (See, for example, DE 2,917,569; DE 2,943,551; and DE 2,943,481). However, there is no teaching in the literature that this reaction could advantageously be used for reducing the content of primary aromatic amines in alcoholysis products of polyurethane-polyurea and/or polyurea waste materials to such an extent that the resulting product could be re-used in polyisocyanate addition polymerization processes.

The reaction of the amine-containing alcoholysis product with a low molecular weight urea and/or carbamic acid ester is advantageously conducted at a temperature of from about 50° to about 200° C., preferably at a temperature of from about 100° to about 180° C. In another preferred embodiment of the invention, the low molecular weight urea and/or carbamic acid ester is added before or during the alcoholysis or glycolysis of the waste material.

In another preferred embodiment of the present invention, the low molecular weight urea is treated with the above mentioned diols and/or polyols at a temperature of from about 100° to about 250° C. before the addition of the polyurethane-polycarbamide and/or polycarbamide waste materials.

The amount of low molecular weight urea and/or carbamic acid ester used is generally calculated so that the equivalent ratio of low molecular weight urea and/or carbamic acid ester to amino groups is from about 1:3 to about 10:1, preferably from about 1:2 to about 3:1.

It may also be advantageous (to promote completion of the reaction) to remove water from the reaction mixture (e.g., by distillation).

Inert solvents may optionally be used for dilution in carrying out the process of the process of the present invention. Examples of suitable inert solvents include: ethanol; methanol; cyclic polyethers such as tetrahydrofuran and dioxane; dialkyl carbonates such as diethyl or dimethyl carbonate; and cyclic carbonates such as ethylene or propylene carbonate. Ethanol and methanol are particularly preferred solvents. When a solvent is used, it will generally be necessary to remove it by distillation before the compounds containing hydroxyl groups are used in an isocyanate addition polymerization process.

The low molecular weight ureas useful in the practice of the present invention include compounds represented by the formula

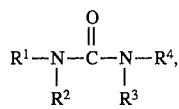

in which

R$^1$, R$^2$, R$^3$ and R$^4$ each represents hydrogen; a linear or branched hydrocarbon radical containing from 1 to 18 (preferably from 1 to 4) carbon atoms, which may optionally be interrupted by heteroatoms such as O or N; or a hydroxyalkyl radical containing from 2 to 12 carbon atoms which may optionally be interrupted by heteroatoms such as O or N. R$^1$, R$^2$, R$^3$ and R$^4$ may be the same or different.

Urea is particularly preferred as a reactant. Suitable carbamic acid esters include ethyl carbamate (urethane) and/or methyl carbamate.

Having thus described our invention, the following Examples are given as being illustrative thereof. All percentages given in these Examples are percentages by weight, unless otherwise indicated.

EXAMPLES

As used herein, the following terms shall have the indicated meaning:

| | |
|---|---|
| OH No. | denotes the hydroxyl number |
| NH No. | denotes the amine number |
| A No. | denotes the acid number. |

The waste material used in the Examples given below was a polyurethane-urea polyether foam based on diphenylmethane diisocyanate which had a density of about 200 g/l, a urethane group content of 1.20 moles/kg and a urea group content of 1.35 moles/kg. Partial size of waste used: 2 to 8 mm (diameter).

Example 1 (Comparison)

750 g of diethylene glycol were introduced at 200° C. into a flat-ground 3.6-liter vessel fitted with a stirrer and a heating mantle. 1500 g of the polyurethane-polyurea waste material were added to the heated vessel over a period of 60 minutes. The waste material was further reacted for an additional 90 minutes at 200° C. under a continuous flow of nitrogen. A homogeneous alcoholysis product was obtained. This product had the following properities:

| | |
|---|---|
| OH No. | 355 |
| NH No. | 32 |
| A No. | 0.55 | primary diamine (diphenylmethane diamine monomer)= 0.6%.

Example 2

750 g of diethylene glycol and 85 g of urea were introduced at 200° C. into a flat-ground 3.6-liter vessel fitted with a stirrer and a heating mantle. 1500 g of polyurethane-polyurea waste material were added to the heated vessel over a period of 60 minutes, and the mixture was stirred for a further 90 minutes at 200° C. under a continuous flow of nitrogen. A homogeneous product was obtained. This product had the following properties:

| | |
|---|---|
| OH No. | 352 |
| NH No. | 22 |
| A No. | 0.47 | primary diamine (diphenylmethane diamine monomer)<0.1%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of compounds containing hydroxyl groups from polyurethane-polyurea and/or polyurea waste material comprising reacting a coarsely ground or finely comminuted polyurethane-polyurea and/or polyurea waste material with
   1) a low molecular weight diol and/or polyol and/or a higher molecular weight diol and/or polyol and
   2) a low molecular weight urea and/or carbamic acid ester.

2. The process of claim 1 in which the waste material is first reacted with the low molecular diol and/or polyol and/or a higher molecular weight diol and/or polyol and the resultant alcoholysis product is then reacted with the low molecular weight urea and/or carbamic acid ester.

3. The process of claim 2 in which a urea is used as reactant 2).

4. The process of claim 2 in which the reaction of waste material and molecular weight diol and/or polyol and/or a higher molecular weight diol and/or polyol is carried out at a temperature of from about 100° to about 260° C.

5. The process of claim 4 in which the reaction of the alcoholysis product with the low molecular weight urea and/or carbamic acid ester is carried out at a temperature of from about 50° to about 200° C.

6. The process of claim 1 in which the waste material is reacted with the low molecular weight diol and/or polyol and/or higher molecular weight diol and/or polyol in the presence of the low molecular weight urea and/or carbamic acid ester.

7. A process for the production of polyisocyanate addition products comprising reacting a polyisocyanate with a compound containing hydroxyl groups prepared by the process of claim 1.

\* \* \* \* \*